United States Patent
Reddy et al.

(10) Patent No.: US 8,681,455 B2
(45) Date of Patent: Mar. 25, 2014

(54) AIR BEARING SLIDER

(75) Inventors: Anil Junuthula Reddy, Minneapolis, MN (US); Manuel Charles Anaya Dufresne, Edina, MN (US)

(73) Assignee: Seagate Technology LLC, Cupertino, CA (US)

(*) Notice: Subject to any disclaimer, the term of this patent is extended or adjusted under 35 U.S.C. 154(b) by 82 days.

(21) Appl. No.: 13/098,721

(22) Filed: May 2, 2011

(65) Prior Publication Data

US 2012/0281318 A1    Nov. 8, 2012

(51) Int. Cl.
*G11B 5/60* (2006.01)

(52) U.S. Cl.
USPC .............. 360/236.2; 360/236.5; 360/236.9; 360/235.5; 360/235.7

(58) Field of Classification Search
USPC ............. 360/236.9, 235.5, 235.7–235.9, 236, 360/236.1–236.2, 236.5–236.7
See application file for complete search history.

(56) References Cited

U.S. PATENT DOCUMENTS

| | | | | |
|---|---|---|---|---|
| 5,353,180 A * | 10/1994 | Murray | | 360/236.1 |
| 5,612,839 A * | 3/1997 | Jacques | | 360/246.2 |
| 5,917,679 A * | 6/1999 | Park et al. | | 360/235.6 |
| 6,021,020 A * | 2/2000 | Itoh et al. | | 360/236.1 |
| 6,072,662 A * | 6/2000 | Utsunomiya | | 360/236.1 |
| 6,137,656 A | 10/2000 | Levi | | |
| 6,144,528 A | 11/2000 | Anaya-Dufresne | | |
| 6,212,032 B1 * | 4/2001 | Park et al. | | 360/234.7 |
| 6,229,672 B1 | 5/2001 | Lee | | |
| 6,356,412 B1 * | 3/2002 | Levi et al. | | 360/237 |
| 6,445,542 B1 | 9/2002 | Levi | | |
| 6,583,961 B2 | 6/2003 | Levi | | |
| 6,646,832 B2 * | 11/2003 | Anaya-Dufresne et al. | | 360/236.2 |
| 6,771,468 B1 | 8/2004 | Levi | | |
| 6,937,440 B2 * | 8/2005 | Rajakumar et al. | | 360/236.2 |
| 6,989,967 B2 | 1/2006 | Pendray | | |
| 7,245,455 B2 | 7/2007 | Rajakumar | | |
| 7,564,650 B2 * | 7/2009 | Kajitani | | 360/235.5 |
| 7,898,769 B2 * | 3/2011 | Bolasna et al. | | 360/236.2 |
| 8,081,400 B1 * | 12/2011 | Hu | | 360/236.3 |
| 8,164,860 B1 * | 4/2012 | Ambekar et al. | | 360/236.2 |
| 2003/0039073 A1 * | 2/2003 | Rao | | 360/235.8 |
| 2004/0190203 A1 * | 9/2004 | Albrecht et al. | | 360/246.1 |
| 2005/0099728 A1 * | 5/2005 | Deng et al. | | 360/236.2 |
| 2007/0047145 A1 * | 3/2007 | Matsumoto | | 360/236.2 |
| 2008/0198509 A1 * | 8/2008 | Bolasna et al. | | 360/235.5 |

* cited by examiner

*Primary Examiner* — Wayne Young
*Assistant Examiner* — Carlose E Garcia
(74) *Attorney, Agent, or Firm* — Mueting Raasch & Gebhardt PA

(57) ABSTRACT

A slider includes a leading edge, a trailing edge, a transducer adjacent to the trailing edge, and an air bearing surface. The air bearing surface includes a forward pad, a rearward pad, and a center rail pad feature disposed along a longitudinal axis of the slider. The center rail pad feature includes a first shallow recess finger and a second shallow recess finger diverging from the longitudinal axis toward the trailing edge.

20 Claims, 3 Drawing Sheets

AIR BEARING SLIDER

BACKGROUND

Computer hard disc drives (HDD) are subject to environmental stress such as changes in temperature and/or altitude (pressure change) for example. These stresses lead to a change in the air properties between the disc and the read/write head (i.e., slider). This change in air properties can result in a change in the fly height (FH) of the read/write transducer located on the slider. The change in fly height can detrimentally affect recording density by affecting the ability of the read/write transducer to track, resulting in increased bit errors.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Figure 1:
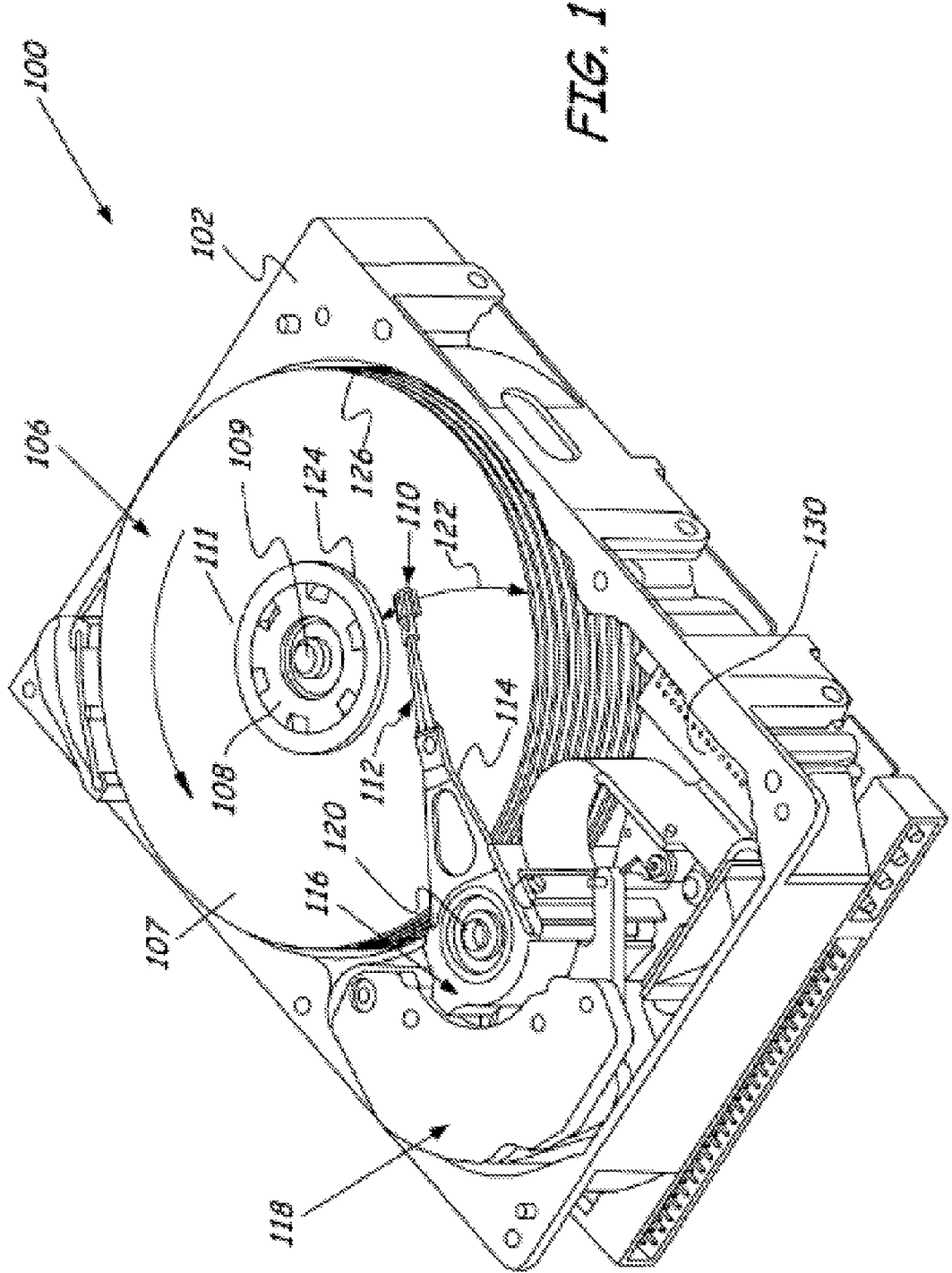
FIG. 1 is an isometric view of a disc drive.

FIG. 1 is an isometric view of a disc drive 100 in which embodiments of the present disclosure are useful. Disc drive 100 includes a housing with a base 102 and a top cover (not shown). Disc drive 100 further includes one or more discs or disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms or actuator arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
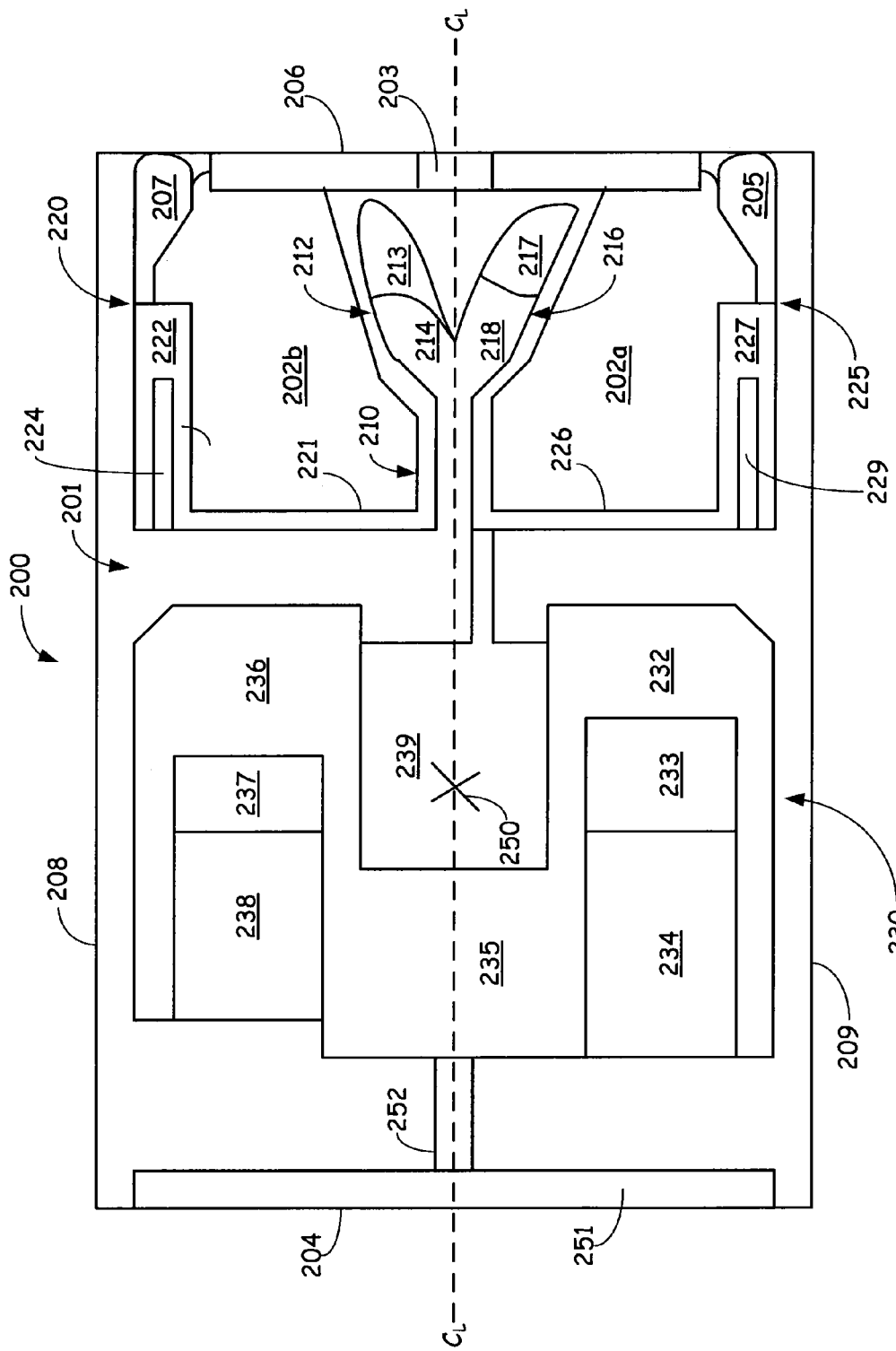
FIG. 2 is a bottom plan view of a slider according to an embodiment of the disclosure.

FIG. 2 is a bottom plan view of a slider 200 according to an embodiment of the disclosure. The slider 200 includes a disc facing, or air bearing surface 201. The slider 200 has a leading edge 204, a trailing edge 206, and side edges 208, 209 extending between the leading edge 204 and the trailing edge 206. The slider 200 includes raised and recessed features to provide positive and negative pressure (relative to ambient pressure) cavities along the length of the slider 200 to enhance the flying properties of the slider 200 during operation. A lateral centerline $C_L$ is illustrated generally bisecting the width of the slider 200.

The slider 200 includes a transducer 203 or sensor such as a read and/or write transducer, for example. In many embodiments, the transducer 203 is located along the centerline $C_L$ and is adjacent to the trailing edge 206.

The slider 200 an air bearing surface 201 can includes a number of raised features. The raised features can include a recess or cavity at least partially defined by the raised feature. The slider 200 an air bearing surface 201 can include a forward pad 230, a rearward pad 220, 225 and a center rail pad feature 210. The center rail pad feature 210 can be disposed along or about the longitudinal axis or lateral centerline $C_L$ of the slider 200.

A leading edge rail 251 is a raised feature that extends along the leading edge 204 of the slider 200. A raised arm element 252 can connect the leading edge rail 251 to the forward pad 230. The leading edge rail 251 is separated from the forward pad and can provide stiffness to the slider body.

The forward pad 230 can include raised elements 236, 235, and 232 that are spaced away from the leading edge 204 and can be at least partially disposed over a load point 250. Raised elements or areas 236, 235, and 232 are raised to generally the same level and are coplanar. In many embodiments, the raised elements or areas 236, 235, and 232 are raised to generally the same level and are coplanar with the leading edge rail 251.

The load point 250 is the point on the slider body where the slider is fixed to the actuating arm of the disc drive. The actuating arm attaches to the slider body on the side opposing the air bearing surface 201. The load point 250 can be located closer to the leading edge 204 than the trailing edge 206.

Recessed areas or regions or cavities 234, 233, 239, 238, 237 are located on the forward pad 230 and are at least partially defined by the raised elements or areas 236, 235, and 232. Surfaces on the slider 200 an air bearing surface 201 that are not labeled are generally coplanar and form a base plane that all of the labeled areas extend away from.

Recessed areas 234, 239 and 238 can be recessed to the same value and can be generally coplanar surfaces. Recessed areas 233 and 237 can be recessed to the same value and can be generally coplanar surfaces and are generally recessed to a value less than (i.e., are shallower than) the recessed areas 234, 239 and 238. Recessed area 239 forms a negative pressure cavity and separates positive pressure cavities 234 and 238. Recessed area 239 can be located along the lateral centerline $C_L$ of the slider 200.

The rearward pad 220, 225 form side rail features and can be connected to the center rail pad feature 210 via arms 221, 226 respectively. The rearward pads 220, 225 include raised side rail features 222 and 227 that define recessed side rail features 224 and 229. Trailing regions 207 and 205 of rearward pads 220, 225 can be recessed to the same height or level (i.e., coplanar) with recessed side rail features 224 and 229. Thus rearward pad 220, 225 includes a shallow feature 205, 207 adjacent to the trailing edge 206 and a raised feature 227, 222 adjacent to a load point 239. In many embodiments, the rearward pad 220, 225 is disposed along or is adjacent to the side edges 208, 209 of the slider 200. In these embodiments, the shallow features 205, 207, 224, 229 are disposed along or adjacent to side edges 208, 209 of the slider 200.

A rearward pad negative pressure cavity 202a, 202b can be disposed between the rearward pad 220, 225 side rail features, and the rearward pad 220, 225 side rail features at least partially defines the rearward pad negative pressure cavity 202a, 202b. The rearward pad negative pressure cavities 202a, 202b can be generally coplanar surfaces and are generally recessed to a value less than the shallow features 205, 207, 224, 229 of the rearward pad 220, 225 side rail features.

The center rail pad feature 210 includes a first shallow recess finger 212 and a second shallow recess finger 216 diverging from the longitudinal axis $C_L$ toward the trailing edge. In many embodiments, the longitudinal axis $C_L$ is the lateral centerline of the slider 200. The first shallow recess finger 212 and a second shallow recess finger 216 are asymmetrical to each other. In other words, the first shallow recess finger 212 and a second shallow recess finger 216 are not mirror images of each other or have different shapes or have different surface areas or volumes. It has been found that dividing the center rail pad feature 210 in this manner and independently manipulating the design feature of each shallow finger 212, 216 enhances the fly height performance of the slider 200 when operated at nearly any altitude.

The first shallow recess finger 212 and a second shallow recess finger 216 form positive pressure cavities. The recess fingers 212, 216 can include two recessed surfaces that are recessed to different values. For example, the recess fingers 212, 216 can include a shallow recessed region 213 and 217 and a deeper recessed region 214, 218.

The shallow recessed region 213 and 217 can be coplanar and recessed to generally the same level. In many embodiments these shallow recessed regions 213 and 217 are coplanar and recessed to generally the same level as the side rail 220, 225 shallow features 205, 207, 224, 229. In many embodiments, the shallow recessed regions 213 and 217 are independently designed and are asymmetrical or not mirror images of each other or have different shapes or have different surface areas or volumes.

The center rail pad feature 210 can separate the rearward pad negative pressure cavities 202a and 202b. The center rail pad feature 210 can at least partially define the rearward pad negative pressure cavities 202a and 202b along with the rearward pad 220, 225 side rail features.

In some illustrative embodiments, the slider 200 an air bearing surface 201 can exhibit the following topography.

The leading edge rail 251, forward pad raised areas 236, 235, and 232, rearward pad raised side rail features 222 and 227, and arms 221, 226 can be coplanar surfaces and are located at the zero etch depth. The forward pad recessed areas 233, 237, side rail shallow features 205, 207, 224, 229, and recess finger shallow recessed regions 213, 217 can be coplanar surfaces and etched to a depth in a range from 0.1 to 0.25 micrometers below the zero etch depth. The forward pad recessed areas 234, 239, 238 and rearward pad negative pressure cavities 202a, 202b can be coplanar surfaces and etched to a depth in a range from 0.5 to 1.5 micrometers below the zero etch depth. The remaining surfaces (including 214, 216) are coplanar surfaces and etched to a depth in a range of about 2 to 4 micrometers below the zero etch depth.

Figure 3:
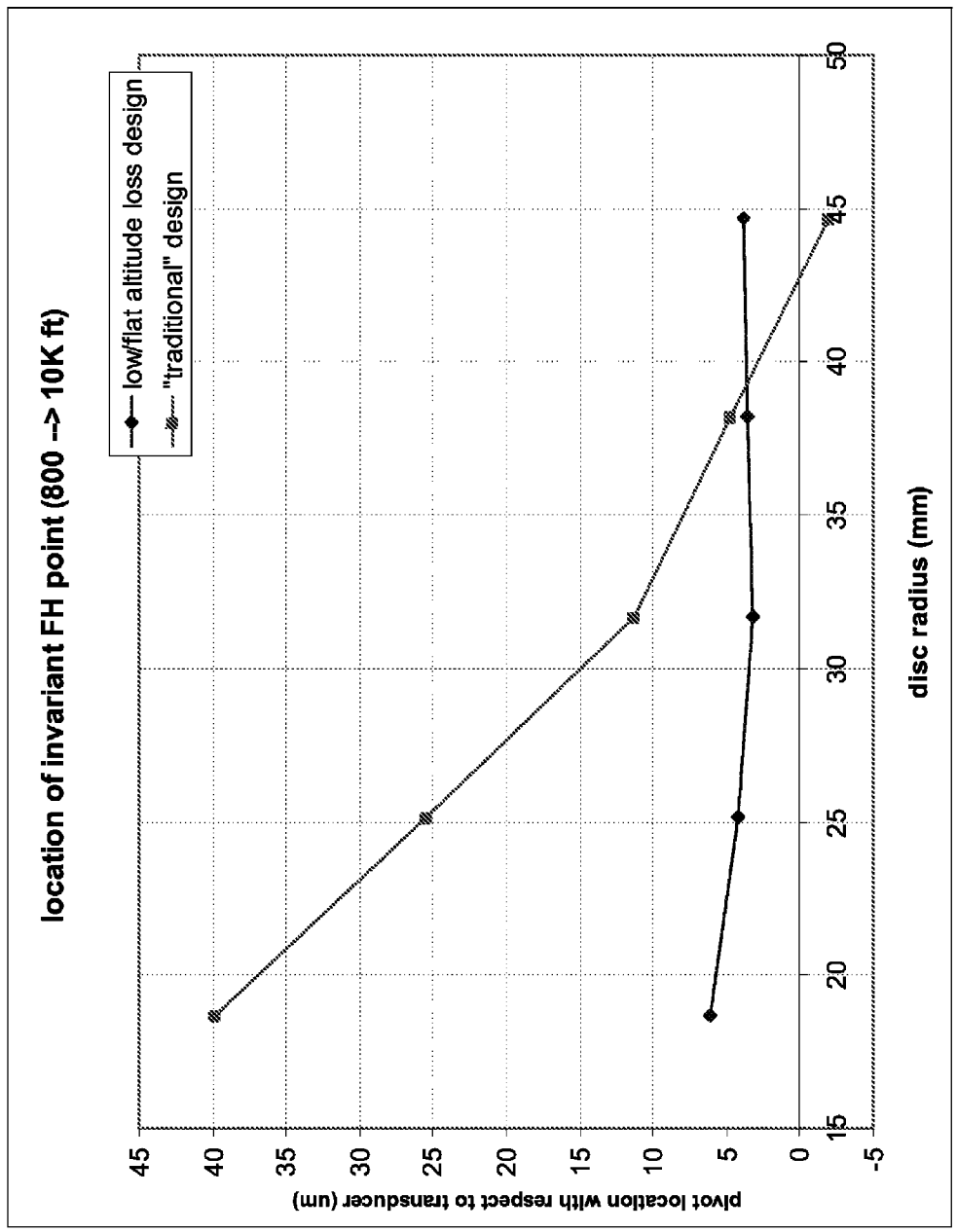
FIG. 3 is a graph of the pivot point location with respect to the transducer as a function of the disc radius for a traditional design and the design according to an embodiment of the disclosure.

FIG. 3 is a graph of the pivot point location with respect to the transducer as a function of the disc radius for a conventional design and the design according to the disclosure. It is believed that independently designing the diverging fingers of the center rail pad feature stabilizes the slider fly height and pivot point location when operated at nearly any altitude and over the range of disc radii and skew. In addition it is believed that the design according to the disclosure concentrates leading edge forces under the load point or dimple of the slider reducing the change in slider fly height as altitude (where the operating disc drive is) is varied.

This figure illustrates that the disclosed slider design, when operated at altitudes differing by at least 2500 meters, maintains the slider pivot point within 10 micrometers of the transducer as the slider travels between the inner diameter and an outer diameter of the disc for the altitudes. The pivot point is the point about which the slider body rotates in going from nominal (i.e., ambient) pressure to altitude conditions. The figures also illustrates that the pivot point location, with respect to the transducer, changes by less than 5 micrometers as the slider travels between the inner diameter and an outer diameter of the disc during operation.

Thus, embodiments of AIR BEARING SLIDER are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. A slider comprising:
   a leading edge;
   a trailing edge;
   a transducer adjacent to the trailing edge;
   an air bearing surface comprising:
      a forward pad;
      a rearward pad; and
      a center rail pad feature adjacent to the transducer and disposed along a longitudinal axis of the slider, the center rail pad feature comprises a first shallow recess finger and a second shallow recess finger diverging from the longitudinal axis toward the trailing edge; and
   the first shallow recess finger and the second shallow recess finger are asymmetrical to each other and each include two recessed regions that are recessed to different values, wherein the first shallow recess finger defines a first finger positive pressure cavity, and the second shallow recess finger defines a second finger positive pressure cavity.

2. The slider according to claim 1, wherein the transducer is disposed along the longitudinal axis.

3. The slider according to claim 1, wherein the slider comprises a load point that is closer to the leading edge than the trailing edge.

4. The slider according to claim 1, wherein the forward pad comprises a negative pressure cavity separating two positive pressure cavities.

5. The slider according to claim 1, wherein the rearward pad comprise a shallow feature adjacent to the trailing edge and a raised feature adjacent to a load point.

6. The slider according to claim 1, wherein the forward pad comprises a negative pressure cavity separating two positive pressure cavities and the rearward pad comprises a shallow feature adjacent to the trailing edge and a raised feature adjacent to a load point.

7. The slider according to claim 6, wherein the shallow feature and the raised feature are adjacent to side edges of the slider.

8. The slider according to claim 1, wherein a forward pad negative pressure cavity is disposed along the longitudinal axis.

9. The slider according to claim 1, wherein the center rail pad feature separates a first rearward pad negative pressure cavity from a second rearward pad negative pressure cavity.

10. The slider according to claim 1, wherein the first shallow recess finger includes a shallow recessed region and a deeper recessed region and the second shallow recess finger includes a shallow recessed region and a deeper recessed region and both the shallow recessed regions and the deeper recessed regions are asymmetrical to each other.

11. A slider comprising:
   a leading edge;
   a trailing edge;
   a transducer adjacent to the trailing edge, the transducer disposed along a lateral centerline of the slider;
   an air bearing surface comprising:
      forward pads;
      a rearward pad comprising a first negative pressure cavity region and a second negative pressure cavity region; and
      a center rail pad feature disposed along the lateral centerline and separating the first negative pressure cavity region from the second negative pressure cavity region, the center rail pad feature comprises a first shallow recess finger and a second shallow recess finger diverging from the lateral centerline toward the trailing edge, the first shallow recess finger defines a first finger positive pressure cavity and the second shallow recess finger defines a second finger positive pressure cavity; and
   the first shallow recess finger and the second shallow recess finger are asymmetrical to each other and each include two recessed regions that are recessed to different values.

12. The slider according to claim 11, wherein the forward pad comprises a negative pressure cavity separating two positive pressure cavities and the negative pressure cavity is disposed along the lateral centerline of the slider.

13. The slider according to claim 11, wherein the forward pad is disposed over a load point.

14. The slider according to claim 11, wherein the slider comprises a load point that is closer to the leading edge than the trailing edge.

15. The slider according to claim 11 wherein the first shallow recess finger includes a shallow recessed region and a deeper recessed region and the second shallow recess finger includes a shallow recessed region and a deeper recessed region and both the shallow recessed regions and the deeper recessed regions are asymmetrical to each other.

16. A system comprising:
   an actuating arm;
   a slider attached to the actuating arm and in communication with a media disc surface, the media disc surface having an inner diameter and an outer diameter, the slider comprises:
      a leading edge;
      a trailing edge;
      a transducer adjacent to the trailing edge;
      an air bearing surface comprising:
         a forward pad;
         a rearward pad comprising a first negative pressure cavity region and a second negative pressure cavity region; and
         a center rail pad feature disposed along a longitudinal axis of the slider and separating the first negative pressure cavity region from the second negative pressure cavity region, the center rail pad feature comprises a first shallow recess finger and a second shallow recess finger diverging from the longitudinal axis toward the trailing edge; and
      the first shallow recess finger and the second shallow recess finger are asymmetrical to each other and each include two recessed regions that are recessed to different values, wherein the first shallow recess finger defines a first finger positive pressure cavity, and the second shallow recess finger defines a second finger positive pressure cavity.

17. The system according to claim 16, wherein the slider has a pivot point location with respect to the transducer that changes by less than 5 micrometers as the slider travels between an inner diameter and an outer diameter of the disc.

18. The system according to claim 16, wherein the slider comprises a load point that is closer to the leading edge than the trailing edge.

19. The system according to claim 16, wherein during operation at altitudes differing by at least 2500 meters, the slider has a pivot point that is within 10 micrometers of the transducer as the slider travels between an inner diameter and an outer diameter of the disc for the altitudes.

20. The system according to claim 16, wherein the first shallow recess finger includes a shallow recessed region and a deeper recessed region and the second shallow recess finger includes a shallow recessed region and a deeper recessed region and both the shallow recessed regions and the deeper recessed regions are asymmetrical to each other.

* * * * *